United States Patent
Salmon

(10) Patent No.: US 8,922,511 B1
(45) Date of Patent: Dec. 30, 2014

(54) DISPLAY CARTRIDGE, SYSTEMS AND DEVICES

(75) Inventor: Peter C. Salmon, Mountain View, CA (US)

(73) Assignee: iBlaidZ, Inc., Mountain View, CA (US)

( * ) Notice: Subject to any disclaimer, the term of this patent is extended or adjusted under 35 U.S.C. 154(b) by 0 days.

(21) Appl. No.: 13/568,470

(22) Filed: Aug. 7, 2012

Related U.S. Application Data

(60) Provisional application No. 61/515,941, filed on Aug. 7, 2011.

(51) Int. Cl.
  *G09G 5/00* (2006.01)
  *G06F 3/041* (2006.01)

(52) U.S. Cl.
  CPC ............................ *G06F 3/041* (2013.01)
  USPC ............................... 345/173; 345/156

(58) Field of Classification Search
  USPC ................. 345/156–184, 104, 905; 361/600–679.3; 178/18.01–20.04; 248/917–924
  See application file for complete search history.

(56) References Cited

U.S. PATENT DOCUMENTS

| | | | |
|---|---|---|---|
| 4,856,088 A * | 8/1989 | Oliwa et al. | 455/349 |
| 6,137,454 A | 10/2000 | Peck | |
| 7,256,802 B2 * | 8/2007 | Park et al. | 345/87 |
| 7,415,289 B2 | 8/2008 | Salmon | |
| 7,929,101 B2 * | 4/2011 | Shinn et al. | 349/150 |
| 8,289,162 B2 * | 10/2012 | Mooring et al. | 340/546 |
| 8,401,377 B2 * | 3/2013 | Kim | 386/362 |
| 2006/0202926 A1 * | 9/2006 | Kobashi et al. | 345/87 |
| 2008/0247126 A1 | 10/2008 | Otsuka et al. | |
| 2008/0266767 A1 * | 10/2008 | Nicholas et al. | 361/681 |

FOREIGN PATENT DOCUMENTS

WO  WO 2008/059345 A2  5/2008

\* cited by examiner

*Primary Examiner* — Patrick F Marinelli
(74) *Attorney, Agent, or Firm* — Kilpatrick, Townsend & Stockton LLP

(57) ABSTRACT

An electronic display may be provided in a cartridge that can be conveniently mated with a host device. The cartridge may comprise a touch display screen, driver and receiver circuits, an area contact array, and a molding encasing the cartridge except for a display viewing area and exposed contact points of the contact array. The contact array may provide an efficient interconnection interface to a host device, and this interface may be releasable for the case of a replaceable cartridge or module. By accepting less than optimal lifetime performance of the display screen but providing it inexpensively and in a module form that is easy to replace, lowered overall consumer costs may be achieved. Inexpensive manufacturing methods may comprise a roll-to-roll fabrication method for fabricating the touch display screen on a flexible substrate as well as transfer or injection molding of the cartridge.

1 Claim, 6 Drawing Sheets

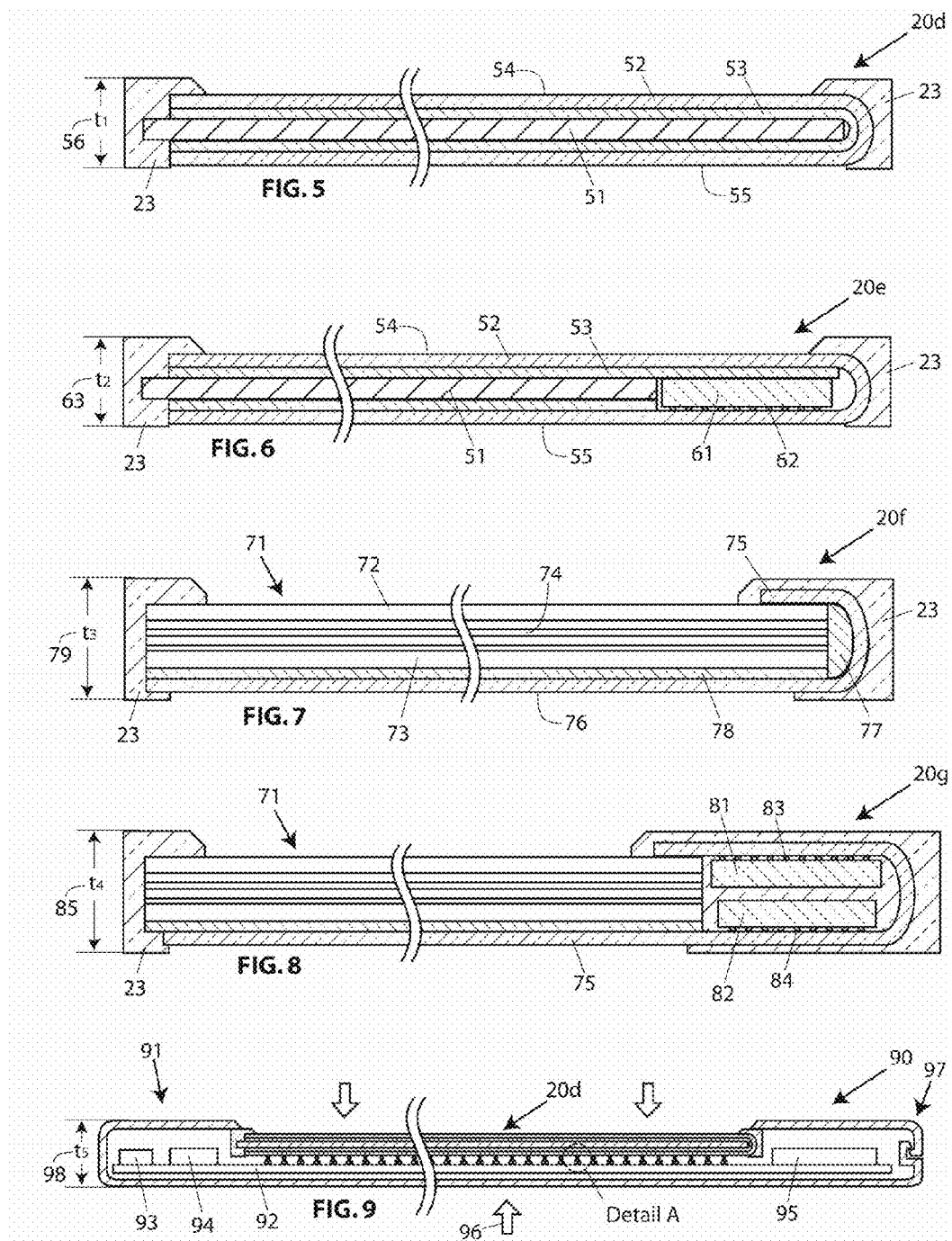

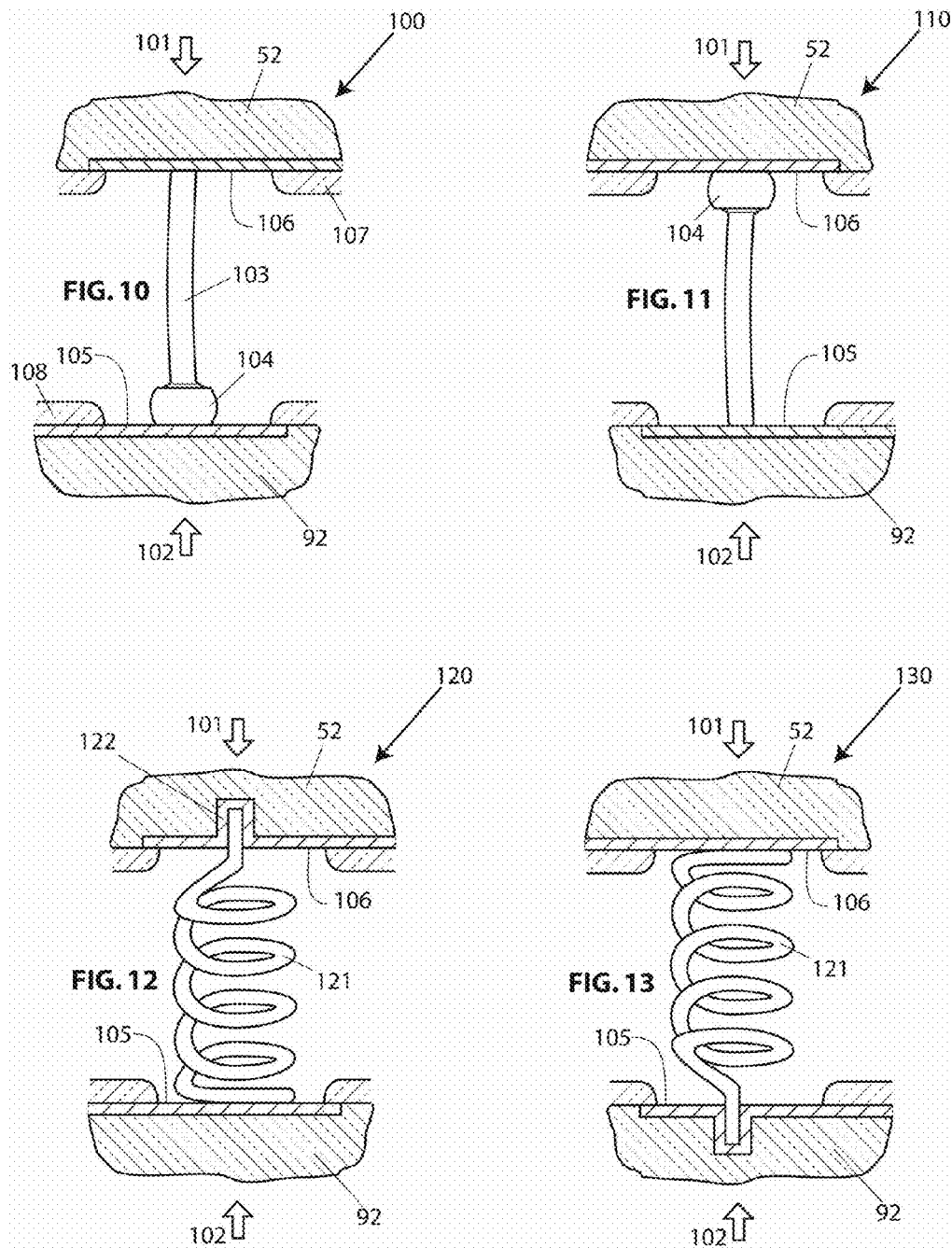

DISPLAY CARTRIDGE, SYSTEMS AND DEVICES

CROSS-REFERENCES TO RELATED APPLICATIONS

This application claims priority to U.S. Provisional Patent Application No. 61/515,941, filed on Aug. 7, 2011, entitled "Display Cartridge", the disclosure of which is hereby incorporated by reference in its entirety for all purposes.

TECHNICAL FIELD

This invention relates to modular display devices and touch screens and more particularly to compact electronic systems comprising a module or cartridge that may be replaceable.

BACKGROUND OF THE INVENTION

The size of electronic devices ranges from the very small to the very large.

Gaming devices, portable data assistants (PDAs) and other portable computing devices, laptops, cell phones, smart phones, video players, music players, medical devices, and numerous other types of electronic devices are typically provided in sizes and shapes that are convenient for a user to hold, carry, and transport, for example, by being able to fit within a user's purse or pocket. For example, portable electronic devices may be used as personal computing platforms, combining computational power and communication capabilities with user convenience in a compact form. Typically such devices include a display used to present pertinent information to the user and, in some cases, the display surface can also be used as a touch sensitive input device. A popular form of such a portable electronic device fits comfortably in a shirt pocket, and the thinnest versions have been desired by consumers.

Thin flexible sheets may be used as substrates for screen devices such as display screens or touch screens of electronic devices. For example, polyester films are available in many thicknesses such as 25 μm (1 mil) to 250 μm (10 mils). These films are flexible; for example they bend under gravity when draped over a shaped object. Polyester films include polyethylene terephthalate (PET) and polyethylene naphthalate (PEN).

Electronic displays may degrade over time. For example, certain colors may fade with use or during storage. In particular, blue colors produced by active matrix organic light emitting diode (AMOLED) displays may have a shorter lifetime than other colors.

Despite the progress made in the displays and other components of electronic devices, there is a need in the art for improved devices, improved methods of constructing the devices, and improved methods of deploying them and using them.

SUMMARY OF THE INVENTION

A device is disclosed having a processor contained in a host module and a memory coupled to the processor, wherein the memory is encoded with instructions that are executable by the processor to provide content signals for a display. The display may be configured as a display cartridge comprising a display screen that is permanently attached to the host module via an area contact array. Alternatively, the attachment may be releasable, wherein the cartridge is held against the host module using a compressive fastening technique. Using either attachment method, images will be displayed on the display screen in accordance with the content signals.

The display cartridge may be molded in a thin rectangular shape with all of the components encased except for a viewing area and contact points on the contact array. Other molded shapes may be used. The contact points may be conductive pads or pins such as copper pillars. The contact points may be provided in an area contact array. The host may have a corresponding area contact array, and an anisotropic conductive film (ACF) may be disposed between the contact arrays.

BRIEF DESCRIPTION OF THE DRAWINGS

FIG. 5 is a cross-sectional view of a display cartridge wherein the display screen is fabricated on a flexible substrate.

FIG. 6 is a cross-sectional view of a display cartridge wherein the display screen is fabricated on a flexible substrate and an interface chip is included in the cartridge.

FIG. 7 is a cross-sectional view of a display cartridge wherein the display screen is fabricated on a rigid substrate and comprises multiple layers.

FIG. 8 is a cross-sectional view of a display cartridge wherein the display screen is fabricated on a rigid substrate, and a pair of interface chips are included in the cartridge.

FIG. 9 is a cross-sectional view of a display cartridge integrated with a host device.

FIG. 10 is an expanded view of detail A of FIG. 9, wherein the ball of the copper pillar is on the host side.

FIG. 11 is an expanded view of a contact assembly wherein the ball of the copper pillar is on the cartridge side.

FIG. 12 is an expanded view of a contact assembly wherein a contact spring is bonded on the cartridge side, and pressed against the host side.

FIG. 13 is an expanded view of a contact assembly wherein the contact spring is bonded on the host side and pressed against the cartridge side.

DETAILED DESCRIPTION

Figure 1:
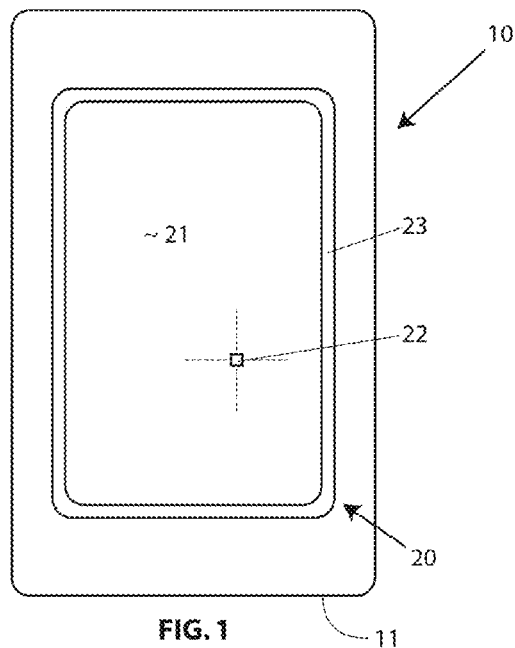
FIG. 1 is a top view of a host device with an integrated display cartridge.

Various embodiments of the present invention are described hereinafter with reference to the figures. It should be noted that the figures are only intended to facilitate the description of specific embodiments of the invention. They are not intended as an exhaustive description of the invention or as a limitation on the scope of the invention. In addition, an aspect described in conjunction with a particular embodiment of the present invention is not necessarily limited to that embodiment and may be practiced in other embodiments. For example, an embodiment of the display cartridge includes a display interface chip and a touch interface chip. These chips may be combined into one chip. The interface chips may reside in either the host or the display cartridge; if provided in the host more electrical terminals may be required in the display cartridge. Data links between the host device and the display cartridge may be wired, or wireless, or a combination of wired and wireless. The display technology employed in the display screen may be active matrix, AM, or passive matrix, PM. It may use organic light emitting diodes, OLEDs, or quantum dot light emitting diodes, QLED, or liquid crystal display, LCD, or EPAPER (electrophoretic display, EPD) technology, or any other display technology that can be used in an electronic display. A touch screen may or may not be included with the display screen; the touch screen may be fabricated on a separate substrate or it may share the same substrate. The flexible substrate may comprise a polymer such as PET or PEN; it may also comprise a metal or a metal alloy such as stainless steel. The display screen may further comprise an image sensing array, on the same or a different substrate. The host device may be a mobile device or a stationary device; it may or may not be linked to networks such as the Internet. Motivation for using a cartridge form of a display device may relate to wear-out characteristics of the device, to manufacturing convenience in having a separate module that can be manufactured independently and requires only late-stage integration with a host, to economic factors, or to any other factors.

Transfer molding and injection molding are manufacturing methods that have been in use for several decades; they may provide a low cost alternative for fabricating modules disclosed herein.

Users of mobile devices may have a general preference for devices having a thin profile. Methods of construction and fabrication described herein may enable mobile devices having thin profiles.

Copper pillars may be produced at contact pads of an electronic device using a wire bonding machine adapted for this purpose; such pillars may be referred to as "stud bumps", and the fabrication process is serial. A wire bonding pitch as small as 35 µm may be achieved using 15 µm diameter wire and a bonded ball diameter of 27 µm for example. Process adaptation may be required to create pillars with the length to height ratio (aspect ratio) described herein. For lower cost in volume production, copper pillars with up to 10:1 aspect ratio may be fabricated in parallel using an electroplating batch mode process.

A popular display screen resolution is provided by the HDTV standard at 1920×1089 pixels. For addressing the pixels, row and column drivers may be used. The drivers may provide signals for controlling light emission or reflection at each pixel for example, and the circuits at each pixel may comprise transistors that are implemented using a thin film transistor (TFT) backplane. An "integrated gate" solution may be provided wherein the row or scan line drivers are integrated with the TFT backplane. Thus, for a 1920×1089 display, it may be required to provide 1920 separate source lines (or data or column lines) to the display, and these may be provided using an area array of contact points, the contact points providing parallel electrical connections between the driver circuits and the TFT backplane circuits. The driver circuits may be described as interface circuits or chips. In addition to the data lines, an additional number of lines (or terminals or connections) may be required for control and power. For example, a total of around 2160 terminals may be provided, connected by the contact array, including 240 terminals for power and control functions and 1920 lines for data. The 2160 total connections may be implemented in an area contact array comprising 60×36 contact points for example. As a further example, if the length, l, and width, w, of the contact array are 60 mm and 36 mm respectively, the required pitch of contacts in the contact array will be 1 mm. If a finer contact pitch of 200 µm is used with the same length and width of the area contact array, 54,000 connections may be implemented. The area contact array may provide a robust and efficient interconnection method, especially for higher resolution displays. In particular, more than ten thousand columns may be provided and this capability may be applied to high resolution medical images such as X-rays for example.

Considering the general problem of interconnecting a display screen with its associated electronic drivers, an area contact array may provide more efficient interconnections than the traditional edge connection arrangement, particularly because average trace lengths will be shorter and the corresponding trace impedances will be lower. Area contact arrays may also enable the use of less complex printed circuit boards, having fewer interconnection layers, again because the area contact arrangement provides more efficient interconnection between the interface electronics and the pixel electronics. Accordingly, it may be beneficial to provide an area contact array rather than an edge contact array at the interface between a display module and its drivers or, if the drivers are integrated with the module, between a display module and its host system.

For convenience herein, a "touch display module" or a "touch display cartridge" is defined herein as a module or cartridge comprising either of or both a touch screen and a display screen.

Continuous roll-to-roll (R2R) manufacturing may produce a lower cost display screen than batch manufacturing on a glass panel for example. Due to process considerations involving more stringent constraints such as process temperature constraints for a flexible substrate than for a rigid substrate, the lower cost may be achieved while sacrificing a performance measure such as color stability or lifetime. However, a shortened lifetime may be mitigated by lower manufacturing cost. Thus in some contexts it may be beneficial to employ a manufacturing method that produces less than optimal lifetime performance, but provides acceptable display performance at lower cost over time.

In some contexts it may be beneficial to provide a display cartridge that is easily mated to a host device.

In some contexts it may be beneficial to provide a display cartridge that can be replaced by a user, using simple tools or no tools.

In some contexts it may be beneficial to modularize a display, so that it can be independently tested and inventoried, ready for integration with a host device in a simplified manufacturing flow.

In some contexts it may be beneficial to create a standardized display cartridge that can be mated with more than one host device.

In some contexts it may be beneficial to ruggedize a display by using a molded material in its manufacture.

In some contexts it may be beneficial to create a display having a thin profile and a light weight, by using advanced manufacturing techniques and lightweight flexible substrates instead of rigid glass substrates.

In some contexts it may be beneficial to create an electronic system having a thin profile, wherein the system may comprise a planar arrangement of a battery, a printed circuit board assembly, and a touch display module. It may be further beneficial to provide a releasable interface between the printed circuit board assembly and the touch display module, thereby making the touch display module replaceable.

FIG. 1 depicts a top view of an electronic device 10 comprising a host device 11 and a display cartridge 20. Display cartridge 20 includes a display screen 21 comprising individual pixels 22. A molded surround 23 encloses cartridge 20, to be further described. For convenient integration of cartridge 20 with host 11, a solder-free attachment method may be employed; the attachment method may comprise a bonding technique or a compressive fastening technique. Compressive fastening may comprise a snap-on configuration, a screw, or a magnet as examples. Thus a user may be able to replace cartridge 20 in host device 10 using simple tools or no tools.

Figure 2:
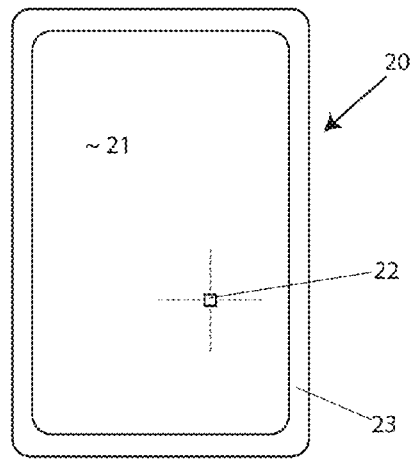
FIG. 2 is a top view of the display cartridge of FIG. 1.

FIG. 2 is a top view of display cartridge 20 comprising display screen 21, pixels 22, and molded surround 23.

Figure 3:
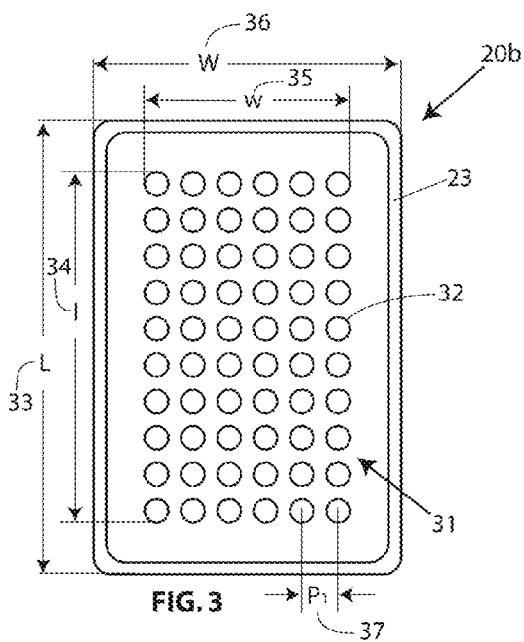
FIG. 3 is a bottom view of the display cartridge of FIG. 2, showing an area contact array comprising contact pads.

FIG. 3 depicts a bottom view of display cartridge 20, labeled 20b, having an area contact array 31 comprising individual contact pads 32 as shown. Area contact array 31 may also comprise a land grid array, LGA, or a ball grid array, BGA, or a micro ball grid array, μBGA as examples. Molded surround or encasement 23 is also shown. Cartridge 20b has a length, L 33, and area contact array 31 has a length, l 34. Cartridge 20b has a width, W 36, and contact array 31 has a width, w, 35. Contacts 32 are shown large in size for the purpose of illustration, but they may have a pitch, $P_1$ 37, as small as 45 μm for example.

Figure 4:
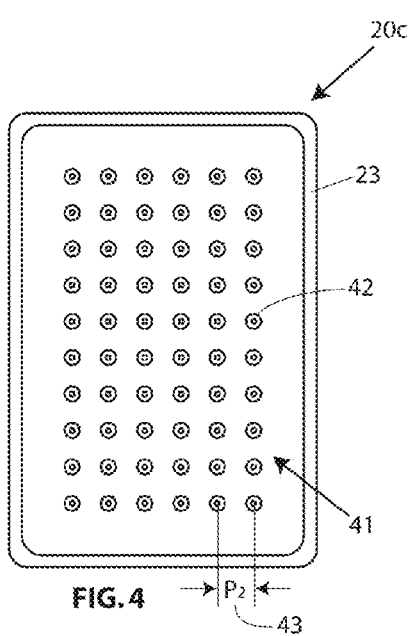
FIG. 4 is a bottom view of the display cartridge of FIG. 2, showing an area contact array comprising pins.

FIG. 4 depicts a bottom view of an alternate display cartridge 20, labeled 20c, having an area contact array 41 comprising individual contact pins 42 as shown. Molded surround 23 is also shown. Pins 42 are shown large in size for the purpose of illustration, but they may have a pitch, $P_2$ 43, as small as 45 μm for example, particularly if they are implemented as copper pillars, to be further described.

FIG. 5 shows an embodiment 20d of display cartridge 20 of FIG. 2 in cross-section. Molded surround 23 is shown. A stiffener 51 is shown, providing mechanical support for a flexible substrate 52 which may be bonded to stiffener 51 using an adhesive layer 53 as shown. Stiffener 51 may comprise a stainless steel sheet having a thickness of around 125 μm for example. The top surface 54 of flexible substrate 52 may comprise thin film circuits that implement a display screen, a touch screen, or a combined display and touch screen referred to herein as a touch display screen. The thin film circuits are not shown in the figure and may be only nanometers thick, for example around 100 nanometers for multiple layers comprising an active matrix organic light emitting diode (AMOLED) display. Flexible substrate 52 typically includes conductive traces to form a printed wiring board (PWB) or flexible circuit. The touch screen and the display screen may be provided on separate flexible substrates (not shown), preferably with area contact arrays disposed between them. Bottom surface 55 of flexible substrate 52 may comprise an area contact array like 31 of FIG. 3 or an area contact array like 41 of FIG. 4. Embodiment 20d may provide a particularly thin version of cartridge 20, having an overall thickness $t_1$ 56 of around 325 μm for example, wherein stiffener 51 may be around 125 μm thick, flexible substrate 52 may be around 50 μm thick, and adhesive layer 53 may also be around 50 μm thick. Such a thin cartridge 20d may enable a thin electronic device 10 of FIG. 1. Thin cartridge 20d may comprise a module having a small volume and a light weight. Cartridge 20d may be rugged, owing in particular to the construction method comprising a transfer or injection molding process to produce molding 23; the molded material providing mechanical support for stiffening member 51 and other components. Further system ruggedness may be achieved using the area contact array on bottom surface 55 rather than an edge contact array.

FIG. 6 shows an embodiment 20e of display cartridge 20 of FIG. 2 in cross-section. Embodiment 20e is similar to embodiment 20d of FIG. 5 except that it further comprises interface circuits in the form of an interface chip 61 that is bonded and electrically connected to flexible substrate 52 using contacts 62 which may comprise a land grid array, LGA, or a ball grid array, BGA, including a micro ball grid array, μBGA. Interface chip 61 may comprise display driver circuits, circuits comprising a touch controller, or a combination of display circuits and touch circuits. Interface chip 61 may be implemented as more than one chip. An anisotropic conductive film, ACF, may be used at the interface between chip 61 and flexible substrate 52. Chip 61 may be thinned, and thickness $t_2$ 63 may be less than 1 mm for example. Embodiment 20e may comprise a module having a small volume and a light weight.

FIG. 7 shows an embodiment 20f of display cartridge 20 of FIG. 2 in cross-section. Embodiment 20f may comprise a stacked configuration 71 comprising stacked layers as shown. Stacked configuration 71 may include rigid glass substrates on the top 72, on the bottom 73, or both, and may further comprise a plurality of layers 74 as shown. Stacked configuration 71 may comprise a liquid crystal display, LCD, or an EPAPER or electrophoretic display, EPD, as examples. Flexible circuit 75 comprises conductive traces (not shown) that connect between an edge contact array (not shown) connecting with stacked configuration 71 and an area contact array (not shown) on the bottom surface 76 of cartridge 20f for connecting with interface circuits or with a host. The area contact array on bottom surface 76 may comprise an array like 31 of FIG. 3 or an array like 41 of FIG. 4. A spacer 77 may be used as shown. Flexible circuit 75 may attach to glass panel 73 using an adhesive layer 78 as shown. The overall thickness $t_3$ 79 of cartridge 20f may be less than 3 mm for example.

FIG. 8 shows an embodiment 20g of display cartridge 20 of FIG. 2 in cross-section. Embodiment 20g is similar to embodiment 20f of FIG. 7 except that it further comprises interface circuits in the form of interface chips 81 and 82 that may be bonded and electrically connected to flexible circuit 75 using contacts such as 83 and 84 which may each be part of an LGA or μBGA as examples. Interface chip 81 may be a display driver chip and interface chip 82 may be a touch controller chip for example; the functions of chips 81 and 82 may also be combined into a single chip. Anisotropic conductive films, ACFs, may also be used at the interfaces between chips 81 and 82 and flexible circuit 75.

FIG. 9 depicts an assembly or integration 90 of a host system 91 with display cartridge 20d of FIG. 5. Host system 91 may comprise a printed circuit board (PCB) 92, a processor 93, a memory 94, and interface circuits 95. Force vectors such as 96 are shown, representing compression applied during integration of the two modules, wherein the module comprising cartridge 20d is pressed against a portion of the module comprising host device 91, the pressed together portions comprising area contact arrays as previously described. The compression may be achieved using a screw, a snap-on assembly, a sliding member, a magnet, or any other compressive device or method. A representative snap-on fastener or latch 97 is shown. The compressive method may require a user to employ a simple tool or no tool, in order to remove, insert or replace a cartridge such as 20d in host system 91. Each of the cartridges described herein may be integrated with host device 91 in a similar manner. Each of the cartridges described herein may also be integrated with more than one type or design of host device; this may require standardization of the pinout of the area contact array for example. Detail A shows the mating of contact points, to be further described. Integration 90 may be thin and light weight owing to the method of construction described herein; thickness $t_5$ 98 may be around 3 mm for example. Further, in light of the fact that the display module is typically a weak point in an electronic system, subject to cracking for example, integration 90 may be rugged with respect to drops, or impacts to which it is subjected, or other stresses induced during use or non-use.

FIG. 10 illustrates a contact assembly 100, showing the mating of contact points referred to as Detail A of FIG. 9. Compression across contact assembly 100 is applied as shown, represented by force vectors 101 and 102. The compression may cause a slight bowing in copper pillar 103 as shown. Bowing of copper pillar 103 may provide manufacturing margin, wherein copper pillars of slightly different lengths can be accommodated, while making good electrical contact between conductive pads such as 105 on PCB 92 of FIG. 9, and corresponding conductive pads such as 106 on the bottom surface of cartridge 20d. Conductive pad 106 may be one contact of an area contact array such as 31 of FIG. 3. Similarly, copper pillar 103 may be one pin element of an area contact array such as 41 of FIG. 4. Copper pillar 103 may include a ball 104, which is produced by a wire bonder used to create the copper pillar or stud bump on conductive pad 105. Bottom surface 55 of flexible substrate 52 defined in reference to FIG. 5 may include a dielectric layer 107 that may define contact pads such as 106 as shown. Similarly, PCB 92 of FIG. 9 may include a dielectric layer 108, commonly referred to as a solder mask layer, that may define contact pads such as 105 as shown. Assembly 100 provides a solder-free contacting configuration; this may be desirable for mating a cartridge such as 20d with a host device such as 91, in a simple manner requiring few tools or no tools. This mating or un-mating of matching modular components may also be conveniently accomplished by a user in a brief period of time, for example less than one minute.

FIG. 11 shows a contacting assembly 110 that is similar to the contacting assembly 100 of FIG. 10 except that ball 104 is provided on contact pad 106 of flexible substrate 52 rather than on contact pad 105 of PCB 92.

FIG. 12 shows a contacting assembly 120 that is similar to the contacting assembly 100 of FIG. 10 except that copper pillar 103 is replaced by a spring element 121. Spring element 121 may terminate in flexible substrate 52 using a blind via 122 as shown, and under the influence of a compression attachment illustrated by force vectors 101 and 102, may provide good electrical contact with contact pad 105 of PCB 92. Spring element 121 may also be surface mounted on contact pad 106 of flexible substrate 52. Spring element 121 may be one element of a contact array like 41 of FIG. 4.

FIG. 13 shows a contact assembly 130 that is similar to contact assembly 120 of FIG. 12 except that spring 121 is terminated in PCB 92 as shown, and makes pressure contact with contact pad 106 of flexible substrate 52 as shown.

Figure 14:
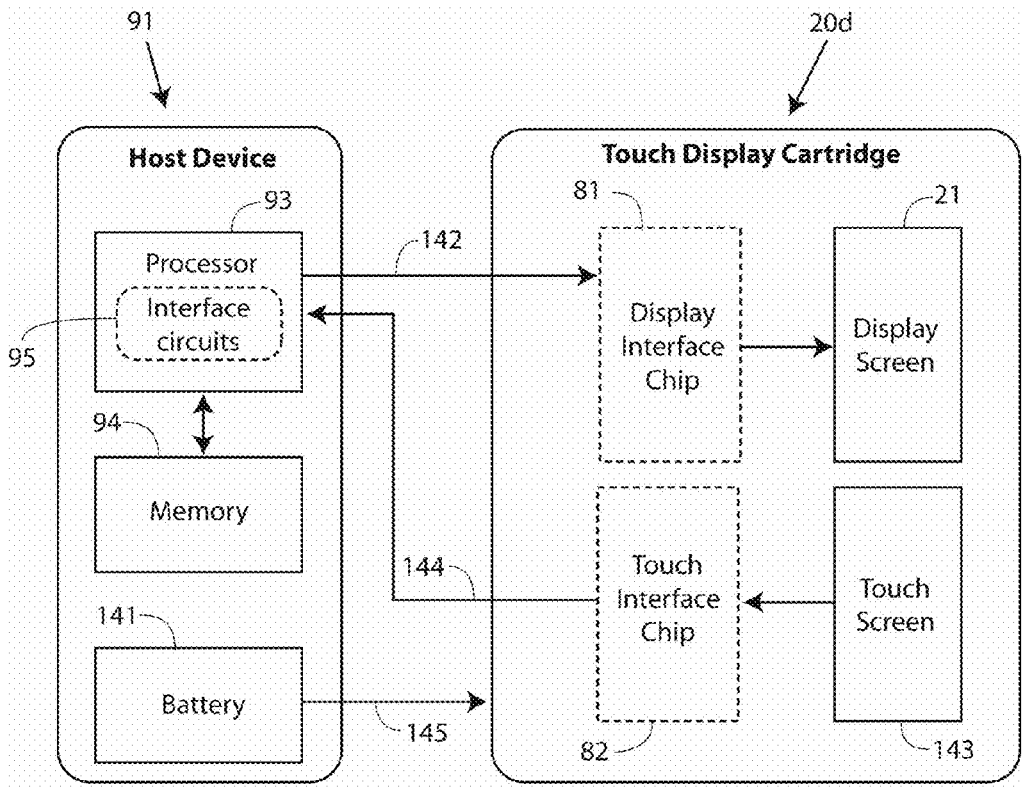
FIG. 14 is a flow diagram showing signal flows between a touch display cartridge and a host device.

FIG. 14 depicts a flow chart showing representative signals flowing between a host device such as 91 and a cartridge device such as 20d, as illustrated in combination in FIG. 9. Host device 91 may include a processor 93, a memory 94, a battery 141, and may also include interface circuits 95. Content signals 142 may flow from processor 93 or interface circuits 95 to display screen 21, possibly including a display interface chip such as 81 in the path. A display data rate of at least 4 Mbps may be required for rendering high resolution images in a mobile device, including fast-action video capability. A touch screen 143 may provide touch signals 144 to processor 93 or interface circuits 95. Processor 93 may act as a touch screen controller, and a touch interface chip such as 82 of FIG. 8 may be provided in the path. Battery 141 may provide power 145 to cartridge 20d as shown.

Figure 15:
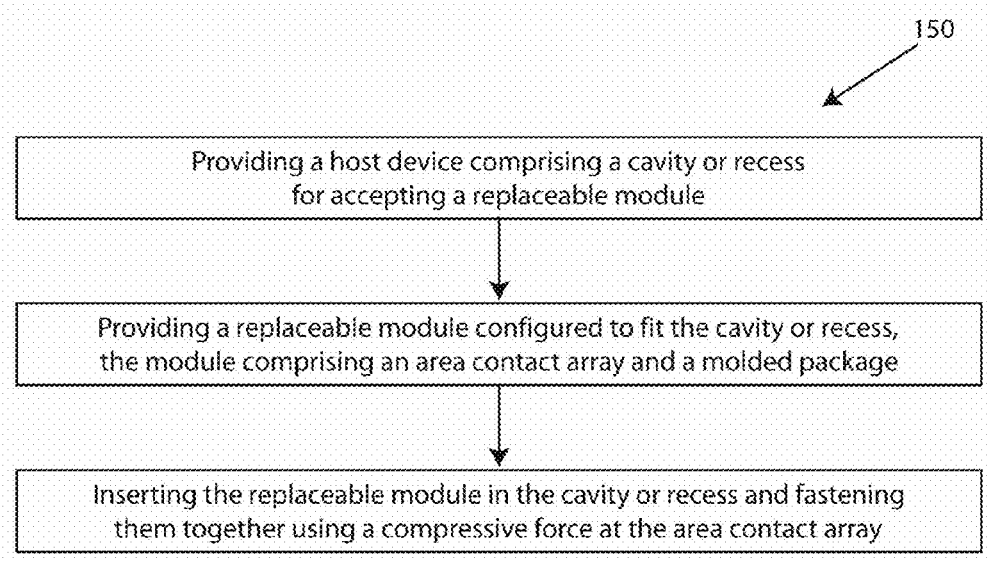
FIG. 15 is a flow chart describing a method for providing a system having a replaceable cartridge.

FIG. 15 illustrates a method for deploying a host device having a replaceable module comprising: providing a host device comprising a cavity or recess for accepting a replaceable module; providing a replaceable module configured to fit the cavity or recess, the module comprising an area contact array and a molded package; inserting the replaceable module in the cavity or recess and fastening them together using a compressive force at the area contact array.

Figure 16:
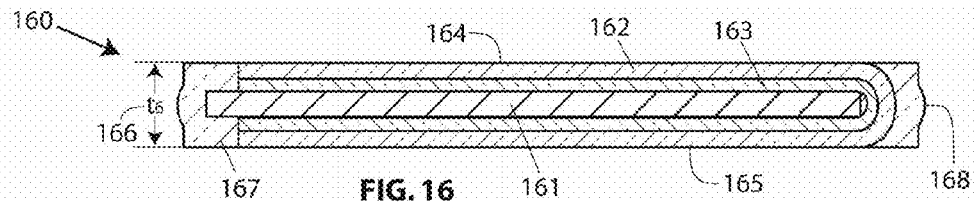
FIG. 16 is a cross-sectional view of a touch display cartridge.

FIG. 16 depicts a touch display cartridge 160. Cartridge 160 comprises a stiffener 161 that may comprise a stainless steel sheet having a thickness of approximately 125 μm. Other materials and thicknesses may be used. Bonded to stiffener 161 is a flexible circuit 162 using adhesive layer 163. Flexible circuit 162 may comprise display and touch circuits (not shown) on top surface 164. Flexible circuit 162 may also comprise an area contact array (not shown) on bottom surface 165. The thickness $t_6$ 166 of cartridge 160 may be around 325 μm for example. Cartridge 160 may also comprise a molded surround 167 which may be formed by transfer or injection molding for example. Cartridge 160 may also comprise a surface feature or detent 168 that may be used for creating a press fit with a matching surface feature in a host device.

Figure 17:
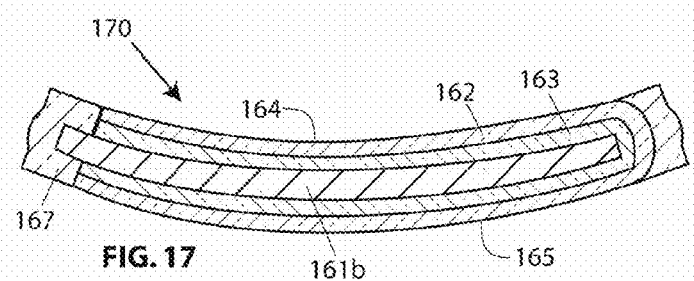
FIG. 17 is a cross-sectional view of a touch display cartridge wherein the stiffener is pre-formed to have a curved shape.

FIG. 17 depicts a cartridge 170 that is similar to cartridge 160 of FIG. 16 except that stiffener 161b has been pre-formed into a curved shape, the curvature preferably formed along the long axis of the associated touch display screen. When mounted against a flat surface as in FIG. 19, the curvature helps to create an even pressure on the area contact array on the bottom side 165 of cartridge 170, pressing it against a corresponding area contact array on the matching host surface, preferably employing an ACF in between.

Figure 18:
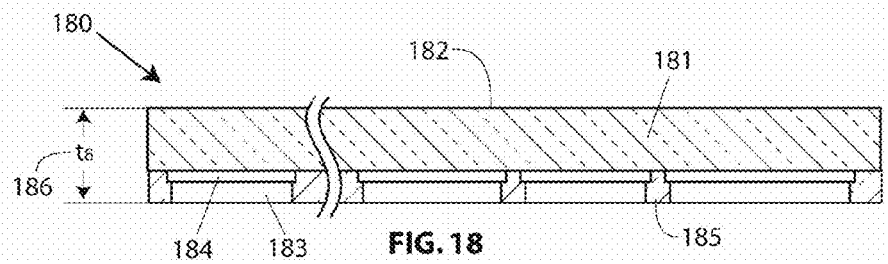
FIG. 18 is a cross-sectional view of a printed circuit board assembly having multiple semiconductor chips attached.

FIG. 18 illustrates a printed circuit board assembly 180, which may comprise an eight layer printed circuit board 181 having a thickness of 0.031 inches or 790 μm for example. An area contact array (not shown) may be provided on the top surface 182, for electrically interfacing with cartridge 170 of FIG. 17. Semiconductor chips such as 183 are shown attached to board 181 using a chip on board (COB) attachment method, with the active surface of the chips facing upwards. The COB attachment method may comprise an individual ACF mounting 184, or an LGA or a pBGA interface as examples. After the chips have been attached and the assembly has been tested, rework may be performed to replace any defective chips, and this cycle may be repeated until a fully functional assembly 180 has been achieved. A support material 185 may be provided as mechanical support around the chips, which may enable the bottom surface to be ground, lapped, or polished, to achieve a uniform thickness and a planar form factor as shown. Support material 185 may be a molded material or a spun on resin as examples. The final chip thickness may be as small as 75 μm or 50 μm for example, and the thickness $t_8$ 186 of PCB assembly 180 may be around 0.9 mm for example.

Figure 19:
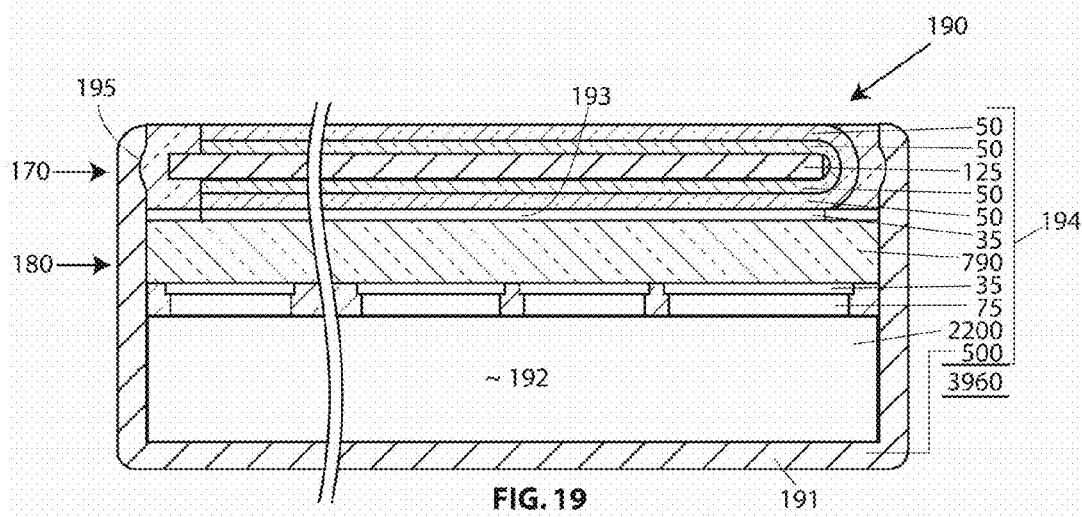
FIG. 19 is a cross-sectional view of an electronic system comprising a battery, a printed circuit board assembly, and a touch display cartridge.

FIG. 19 depicts an electronic system 190 comprising a case 191, a touch display cartridge 170 of FIG. 17, a PCB assembly 180 of FIG. 18, and a battery 192. A feature 195 in case 191 corresponds with feature 168 of FIG. 16, enabling a snap fit between cartridge 170 and host system 190, which may be used to provide a compressive force at the interface between them. An anisotropic conductive film 193 may be used at the interface between cartridge 170 and PCB assembly 180 as shown, to be further described in reference to FIG. 20. Elements 170, 180, and 192 are substantially planar, and system 190 is densely packed. The primary paths for dissipating heat generated by the active elements in system 190 comprise the top and bottom surfaces of the system, and low power versions of the semiconductor chips may be employed. A listing 194 of representative and approximate thicknesses of each of the layers in μm units is shown, summing to a total thickness of 3,960 μm or just under 4 mm for system 190.

Figure 20:
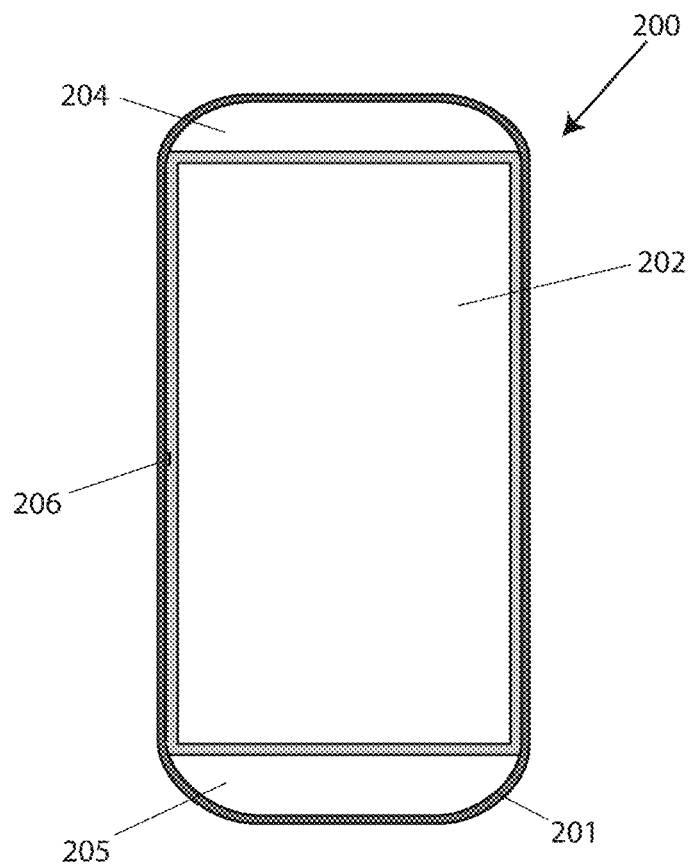
FIG. 20 is a top view of an electronic device having a center section comprising planar components, and end sections comprising other components that may not be planar.

FIG. 20 illustrates an electronic system 200 comprising a case 201, a center section 202, and end sections 204 and 205. Center section 202 may comprise a stacked configuration of layers or planar elements including a battery, a printed circuit board assembly, and a touch display cartridge as shown in FIG. 19. End sections 204 and 205 may contain non-planar elements. In a system comprising a portable device the non-planar elements may include a front and a back camera, a speaker, a microphone, and switches for example. Printed circuit board 181 of FIG. 18 may extend into end sections 204 and 205 to provide electrical connection means for components contained therein. System 200 may be as thin as 4 mm, comprising a stack of planar elements as depicted in FIG. 19. System 200 may be rugged, particularly because the planar elements are securely held and because the electrical interfaces comprising area contact arrays may be inherently rugged.

Figure 21:
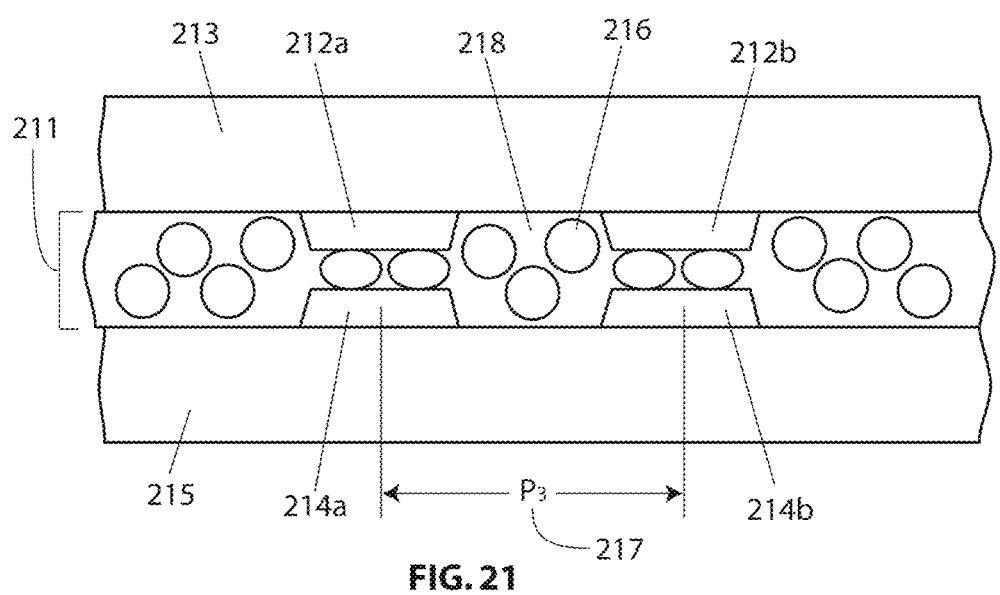
FIG. 21 is an expanded schematic view of an anisotropic conductive film used in an interface between a pair of area contact arrays.

FIG. 21 depicts an expanded schematic view of a portion of anisotropic conductive film 211 (ACF) sandwiched between contacts 212a and 212b of an area contact array on an upper circuit 213, and contacts 214a and 214b of an area contact array on a lower circuit 215. Upper circuit 213 may represent surface 165 of touch display cartridge 170 shown in FIG. 17 for example. Lower circuit 215 may represent surface 182 of PCB assembly 180 shown in FIG. 18 for example. ACF 211 may comprise spherical balls 216, each ball comprising an elastic polymer center and coatings of nickel and gold for example, as developed by SONY corporation and others. The thickness of ACF 211 may be around 35 μm, and the ball diameter may be around 3 μm for example. The pitch between contacts $P_3$ 217 may be around 200 μm for example. As shown, balls that are captured between contacts become compressed, thereby providing a good electrical connection. Balls that are not captured between contacts are surrounded by a matrix material 218 that is non-conducting, so the lateral paths such as between contacts 212a and 212b are also non-conducting. Conventional ACFs may include a matrix material comprising a thermosetting polymer; they are typically subjected to laminating conditions of around 1.5 MPa at a temperature of around 80° C. for around 2 seconds, then to main bonding conditions comprising a pressure of around 7 MPa at a temperature of around 190° C. for around 10 seconds, ending in a permanently bonded film. If such a process is applied to ACF 193 in FIG. 19, the connection between cartridge 190 and PCB assembly 180 will be permanent and cartridge 190 may not be a replaceable cartridge, except for the possibility of using a difficult rework procedure. However, a different version of ACF may be used wherein matrix 218 is an elastomer such as a rubber or an elastomeric foam, thereby enabling an ACF that is releasable from the area array contacts after being used for electrical connection at the interface. If such a releasable ACF is used and a compressive force is applied, such as by using curved cartridge 170 of FIG. 17, then cartridge 170 may become replaceable.

The foregoing descriptions of embodiments are to be understood as being in every respect illustrative and exemplary, but not restrictive, and the scope of the subject matter disclosed herein is not to be determined only from the detailed description of illustrative embodiments but according to the full breadth permitted by the patent laws. It is to be understood that the embodiments shown and described herein are only illustrative of the principles of the present subject matter and that various modifications may be implemented by those skilled in the art without departing from the scope and spirit of the invention.

What is claimed is:

1. An electronic system comprising:
a case;
a battery that is co-extensive with an internal dimension of the case;
a printed circuit board assembly comprising semiconductor chips, the assembly co-extensive with the internal dimension of the case;
a touch display module that is co-extensive with the internal dimension of the case;
corresponding area contact arrays on each of the printed circuit board assembly and the touch display module; and
an anisotropic conductive film disposed between the corresponding area contact arrays, wherein the anisotropic conductive film is releasable from the area contact arrays after use in the system,
wherein the battery, the printed circuit board assembly and the touch display module are configured as planar elements that are stacked within the case.

* * * * *